United States Patent [19]

Suzuki et al.

[11] Patent Number: 4,502,290

[45] Date of Patent: Mar. 5, 1985

[54] AIR CONDITIONER

[75] Inventors: Akio Suzuki; Mitsuo Akiyama, both of Tochigi; Susumu Kashiwazaki, Utsunomiya; Shigeyasu Suzuki; Yasunori Tominaga, both of Tochigi; Michihisa Arakawa, Utsunomiya, all of Japan

[73] Assignee: Hitachi, Ltd., Tokyo, Japan

[21] Appl. No.: 558,276

[22] Filed: Dec. 5, 1983

[30] Foreign Application Priority Data

Dec. 6, 1982 [JP] Japan .............................. 57-212789

[51] Int. Cl.³ ........................ F25B 1/00; G05D 23/00
[52] U.S. Cl. ............................................ 62/229; 236/47
[58] Field of Search .................. 236/47, 68 B; 62/229

[56] References Cited

U.S. PATENT DOCUMENTS 3,352,490 11/1967 Dalzell et al. .......................... 236/47
3,974,426 8/1976 Gingras .............................. 236/47 X
4,095,740 6/1978 Wirth ................................... 236/47

FOREIGN PATENT DOCUMENTS 1005175 9/1965 United Kingdom .................. 236/47

Primary Examiner—William E. Wayner
Attorney, Agent, or Firm—Antonelli, Terry & Wands

[57] ABSTRACT

An air conditioner including a room temperature detector, a room temperature adjuster and a controller is disclosed which is provided with a photodetector, and in which the temperature set in the room temperature adjuster is changed on the basis of the illuminance detected by the photodetector, and a signal for controlling a compressor is generated by the controller in accordance with the temperature thus changed.

2 Claims, 15 Drawing Figures

AIR CONDITIONER

The present invention relates to an air conditioner, and more particularly to an air conditioner in which a temperature set by a room temperature adjuster is controlled on the basis of the illuminance detected by a photodetector.

An example of a conventional air conditioner will first be explained, with reference to FIGS. 1 to 5. Referring to FIGS. 1 to 3, a main part 1 of an air conditioner includes therein a heat exchanger, a fan, electric parts, a controller, and others. Further, the main part 1 is provided on the front side thereof with an air suction opening 2 and an air diffuser 3. An operation part 4 for generating various control commands is provided on the surface thereof with an operation button, changeover switches, and a display device. A display part 5 displays thereon the control commands given by the operation part 4, the temperature detected by a room temperature detector 6, and others. The room temperature detector 6 is formed by providing a hole, through which air can flow, in a portion of the operation part 4 and by mounting a thermistor in the hole. A connecting cord 7 connects the operation part 4 with the controller and the display part. The operation part 4 is provided with a main operation button 4a for specifying "OPERATION" or "STOP" and for setting a timer, an operation changeover switch 4b for selecting one of a "fan" operation for operating only the fan, a "cooling" operation for carrying out a cooling operation in addition to the fan operation, a "dry" operation for reducing the humidity in a room, a "heating" operation for carrying out a heating operation, and a "heating plus heater" operation for increasing the heating ability of the heating operation when room temperature is low, an airflow changeover switch 4c for selecting one of an "automatic" operation for automatically controlling airflow, a "strong wind" operation for producing a large airflow, a "weak wind" operation for producing a small airflow, and a "gentle wind" operation for producing only a little airflow, a room temperature adjusting switch 4d for changing the temperature set in the air conditioner, a switch 4e for operating a first temperature control circuit, a switch 4f for operating a second temperature control circuit, a timer turn-off switch 4g, and a timer turn-on switch 4h. When the operation button 4a is set to the "OPERATION" in the state that the first temperature control circuit is operated by the switch 4e, a temperature d is set in the air conditioner for one hour between a starting time A and a time B, as shown in FIG. 4. The temperature set in the air conditioner is changed from the temperature d at the time B. Further, after a timer B', the air conditioner is operated so that room temperature is kept at a temperature e which is 1° C. higher than the temperature d, for a cooling operation, or at a temperature e' which is 1° C. lower than the temperature d, for a heating operation. Such an operation of the air conditioner is carried out for the following reason. Before the air conditioner is operated, room temperature is substantially the same as the temperature of walls and a floor, that is, is higher or lower than a desired temperature according as a cooling operation or a heating operation is required. Even if the temperature set in the air conditioner at an operation starting time when a human body sensitive temperature (hereinafter referred to as an "effective temperature") is greatly affected by the radiant heat from the walls and floor, is changed at a time when one hour has elapsed after the operation starting time so that the effective temperature is scarcely affected by the radiant heat from the walls and floor having substantially the same temperature as the set temperature, the effective temperature will be kept substantially constant. For this reason, the temperature specified by the room temperature adjusting switch 4d is automatically changed by the first temperature control circuit. Further, when the first temperature control circuit switch 4e is set to "OFF", the temperature specified by the room temperature adjusting switch 4d is kept unchanged. Now, the second temperature control circuit switch 4f, the timer turn-off switch 4g and the timer turn-on switch 4h will be explained. When the main operation button 4a is set to "TIMER" after the timer turn-off switch 4g has been set to a predetermined time, the air conditioner operates for the time set by the turn-off switch 4g. Further, when the timer turn-on switch 4h is set in place of the timer turn-off switch 4g, the air conditioner begins to operate at a time set by the switch 4h. Further, let us consider the case where the second temperature control circuit switch 4f is set to "ON", the timer turn-off switch 4g is set to a desired time, the main operation button 4a is set to "TIMER" and a temperature d is preset in the air conditioner. As shown in FIG. 5, for a cooling operation, the air conditioner is operated by a timer at a time C when the main operation button 4a is set, and the preset temperature d is changed at a time D when one hour has elapsed after the time C. Further, after a time D', the air conditioner is operated so that room temperature is kept at a temperature f which is 3° C. higher than the temperature d, till a time E specified by the timer turn-off switch 4g. The above operation of the air conditioner is stopped at the time E. For a heating operation, the air conditioner is operated so that room temperature is kept at a temperature f' which is 5° C. lower than the temperature d, for a period between the time D' and the time E, and the operation of the air conditioner is stopped at the time E. The above-mentioned second temperature control operation is performed on the basis of the following fact. If a person goes to bed at the time C and falls asleep at the time D, the metabolic rate of human energy measured before the time D will be different from that measured after the time D. The metabolic rate of human energy varies with the human race, physical constitution, age, sex and others. Generally speaking, a fundamental metabolic rate required for the beating of the heart, the respiratory motion and the maintenance of body heat is 5 to 10% smaller in a sleeping state than in an awake state. Further, a metabolic rate in a sit-down state before bedtime is 20% larger than the fundamental metabolic rate in the sleeping state, and a metabolic rate in a standing state is 30% larger than the fundamental metabolic rate in the sleeping state. In view of the above fact, for a cooling operation, the temperature set in the air conditioner is increased by a value corresponding to a difference between the metabolic rate in the sit-down state and that in the sleeping state, for a sleeping period. While, for a heating operation, the temperature set in the air conditioner is decreased by the abovementioned value for a sleeping period, taking into consideration the facts that the metabolic rate in a sleeping state is smaller than that in the sit-down state and a room subjected to air conditioning is thermally insulated.

In order to operate such a useful second temperature control circuit, the second temperature control circuit switch 4f, the timer turn-off switch 4g and the main operation button 4a have to be operated. However, at least one of the switches and button is sometimes erroneously set, or it is often forgotten to set the switches and button. Further, in some cases, a child, woman or aged person does not wish to use the second temperature control circuit for the reason that it is not simple to operate the second temperature control circuit, or fails to perform a desired temperature control operation. Further, when a person gets out of bed after the second temperature control circuit has been set, the air conditioner is operated so that room temperature is kept at a temperature which differs from a desired temperature. On the other hand, when the first temperature control circuit is operated, comfortable air conditioning can be carried out while preventing excess heating or cooling and economizing in electric power. In some cases, however, it is forgotten to set switches relevant to the first temperature control circuit, and therefore the air conditioner continues to perform a wasteful operation.

A main object of the present invention is to provide an air conditioner which includes a photodetector and can automatically change a temperature set in the air conditioner, on the basis of the illuminance detected by the photodetector.

In order to attain the above object, according to the present invention, there is provided an air conditioner including a photodetector in addition to a control device made up of a room temperature detector, a room temperature adjuster, a controller and an output part, in which the controller generates a signal for changing a temperature set in the room temperature adjuster, on the basis of the illuminance detected by the photodetector, and an output from the controller controls a fan, a compressor, a timer and others.

The present invention will be apparent from the following detailed description taken in conjunction with the accompanying drawings, in which.

Figure 1:
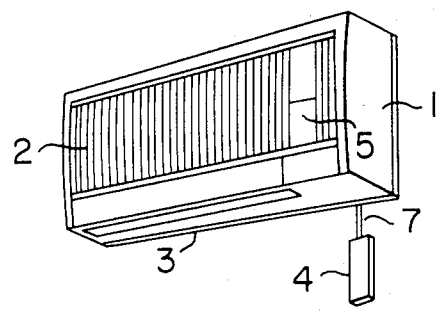
FIG. 1 is a perspective view showing the exterior of a conventional air conditioner.
Figure 2:
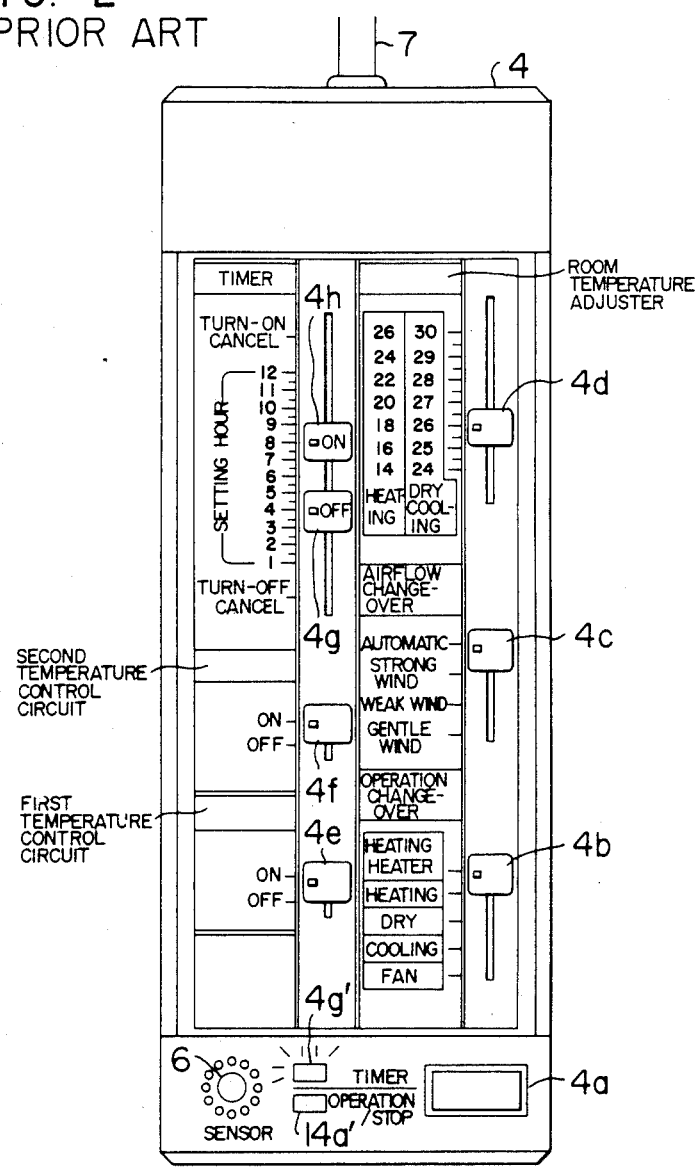
FIG. 2 is an enlarged view of the operation part shown in FIG. 1.
Figure 3:
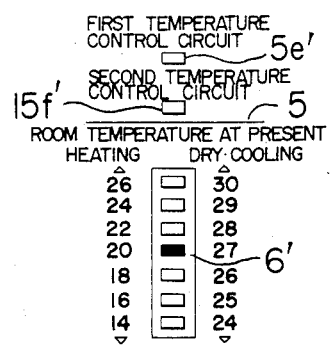
FIG. 3 is an enlarged view of the display part shown in FIG. 1.
Figure 4:
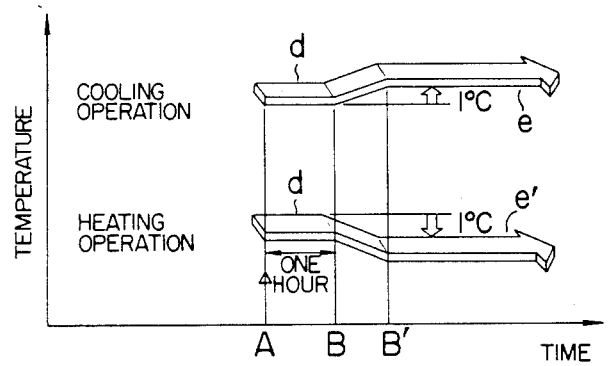
FIG. 4 is a graph showing operation patterns of the first temperature control circuit of the conventional air conditioner.
Figure 5:
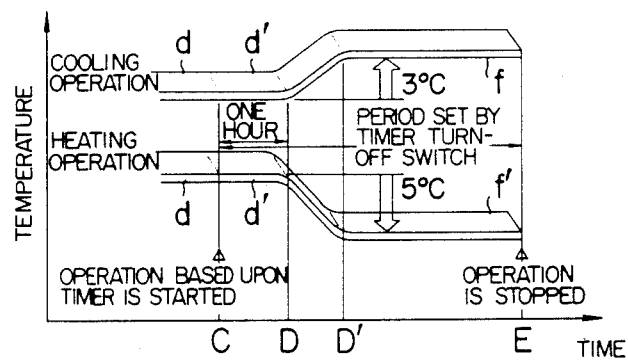
FIG. 5 is a graph showing operation patterns of the second temperature control circuit of the conventional air conditioner.
Figure 6:
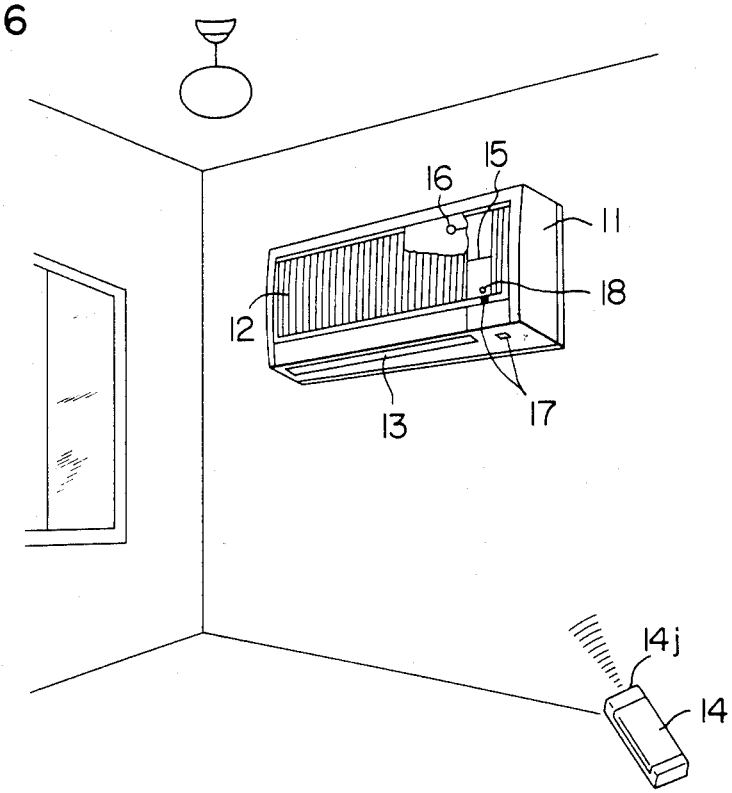
FIG. 6 is a perspective view showing the exterior of an embodiment of an air conditioner according to the present invention.
Figure 9:
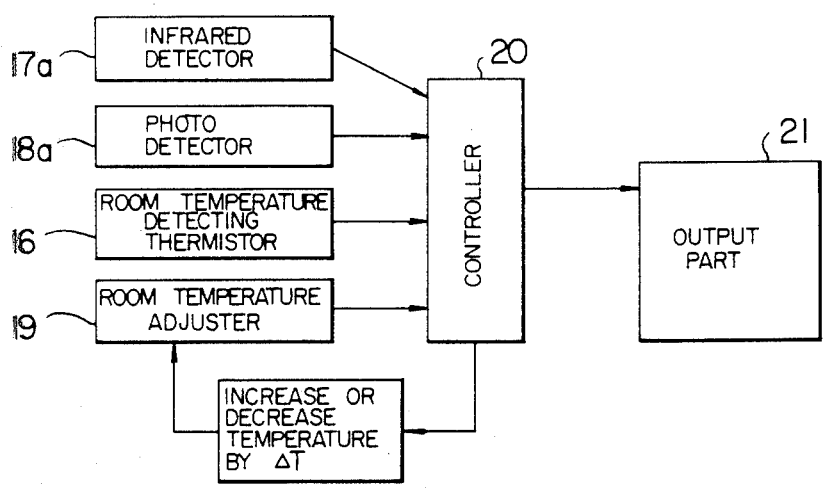
FIG. 9 is a block diagram showing a control device included in the embodiment of FIG. 6.
Figure 7:
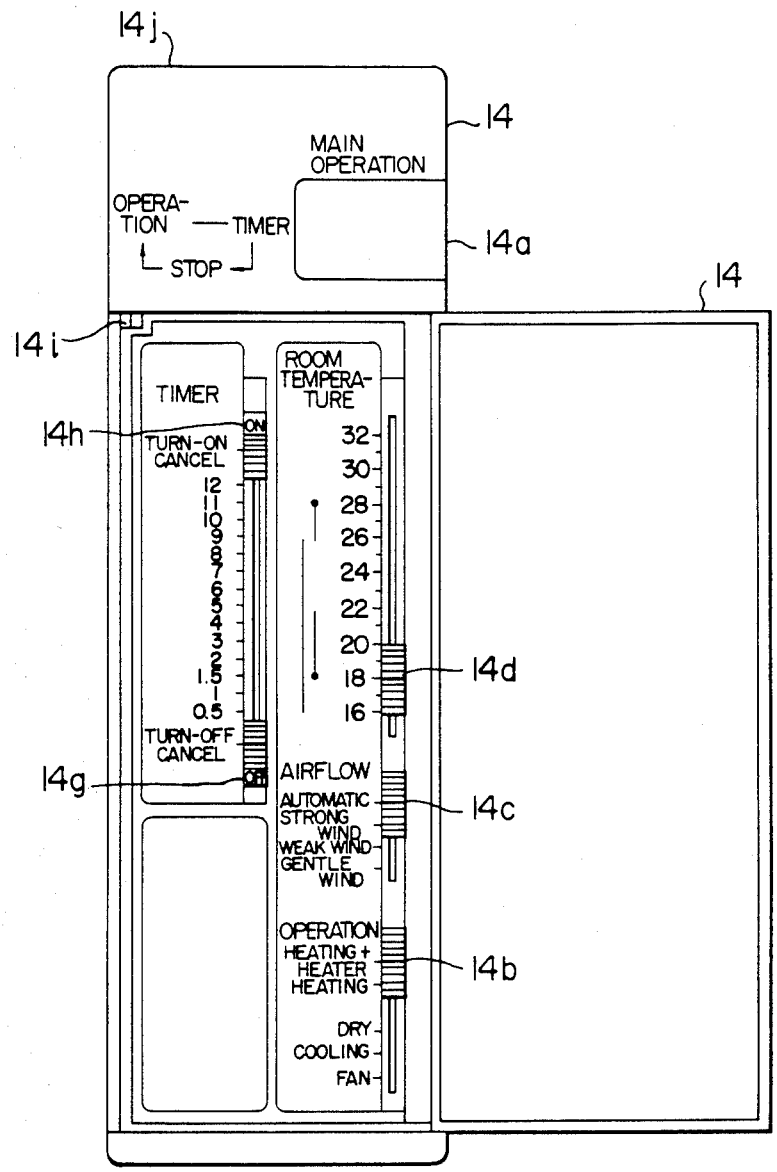
FIG. 7 is an enlarged view of the operation part shown in FIG. 6.
Figure 8:
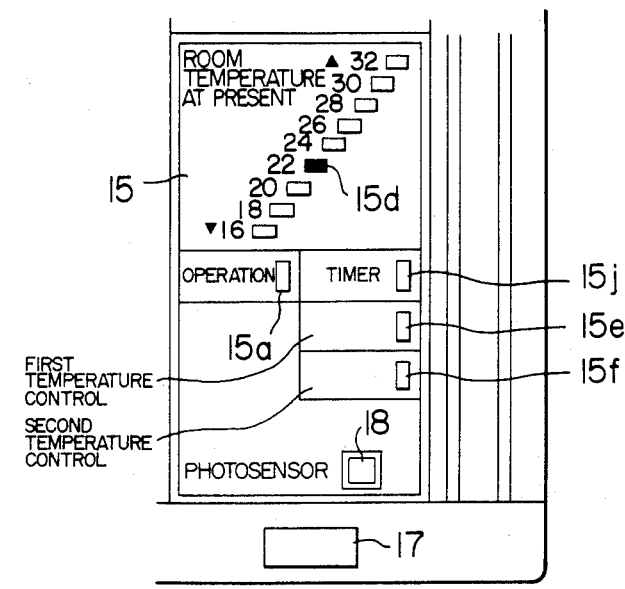
FIG. 8 is an enlarged view of the display part shown in FIG. 6.
Figure 10:
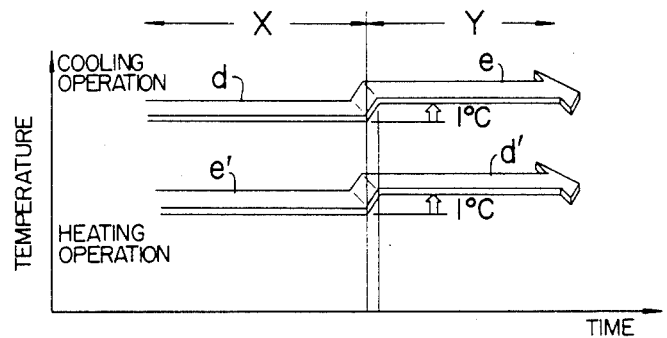
FIG. 10 is a graph showing operation patterns of the first temperature control circuit of the embodiment shown in FIG. 6.

An embodiment of an air conditioner according to the present invention will be explained below, with reference to FIGS. 6 to 14. Referring to FIG. 6, a main part 11 of the embodiment includes therein a heat exchanger, a fan, electric parts, controller and others. Further, the main part 11 is provided on the front side thereof with an air suction opening 12 and an air diffuser 13. An operation part 14 for generating various control commands is provided at an end portion thereof with an oscillator 14j. Further, in FIG. 6, reference numeral 15 designates a display part disposed in the front surface of the main part 11, 16 a thermistor mounted in the air suction opening 12 for detecting room temperature, 17 receiving windows provided in the front surface and lower surface of the main part 11 for receiving a signal sent out from the oscillator 14j which is provided in the end portion of the main part 11, and 18 a light receiving window provided in the front surface of the main part 11. As shown in FIG. 7, the operation part 14 includes an operation changeover switch 14b, an airflow changeover switch 14c and a room-temperature adjusting switch 14d in a direction from the lower right corner of the operation part 14 to the upper right corner thereof, and includes a timer turn-off switch 14g and a timer turn-on switch 14h in a direction from the lower left corner of the operation part 14 to the upper left corner thereof. The switches 14g and 14h reset and set a timer in a desired manner, respectively. The switches 14b, 14c, 14d, 14g and 14h are hidden with a lid 14'. When an oscillation switch 14i is turned on in the state that the lid 14' is made open, a changeover signal specified by each of the operation changeover switch 14b, airflow changer switch 14c, room-temperature adjusting switch 14d, timer turn-off switch 14g and timer turn-on switch 14h can be sent out. When the lid 14' is put in the closed state, such a changeover signal is not sent out. However, when a main operation button 14a is depressed in the state that the lip is closed, signals indicating operations and values set by the switches 14b, 14c, 14d, 14g and 14h are sent out, with the aid of infrared rays emitted from the oscillator 14j. Referring to FIG. 9, the infrared rays from the oscillator 14j are incident upon the receiving window 17 shown in FIG. 6, to be detected by an infrared-detector 17a, and thus the above-mentioned signals are sent from the infrared-detector 17a to a controller 20. FIG. 8 shows the display part 15 for displaying the operating state of the embodiment. When the main operation button 14a on the operation part 14 shown in FIG. 7 is depressed, the embodiment begins to operate at a specified mode and a specified temperature, and an "OPERATION" indicating element 15a is turned on. Further, in the case where the timer turn-off switch 14g is set to, for example, "8", when the main operation button is depressed once more, the embodiment is operated by a timer for eight hours, and a "TIMER" indicating element 15j is turned on. Further, a "FIRST TEMPERATURE CONTROL" indicating element 15e and a "SECOND TEMPERATURE CONTROL" indicating element 15f are not set by the operation part, but are operated in a manner different from a conventional manner. That is, in the case where a first temperature control operation is required in a cooling period on the basis of the illuminance detected by a photodetector 18a which is disposed in the light receiving window 18, the preset temperature is increased by 1° C., and the "FIRST TEMPERATURE CONTROL" indicating element 15e is turned on. While, in the case where a first temperature control operation is required in a heating period, the preset temerature is decreased by 1° C., and the element 15e is turned on. Now, let us consider the case shown in FIG. 10, by way of example. For a cooling operation, the embodiment is operated on the basis of a preset temperature d in the daytime when the sun shines and it is light outside, since a room subjected to air conditioning receives a large amount of radiant heat from the outside. In the evening, the embodiment is operated on the basis of a temperature e which is automatically made 1° C. higher than the preset temperature d by detecting a reduction in each of illuminance and radiant heat caused by the sunset, that is, a first temperature control operation is performed. While, for a heating operation, the embodiment is operated on the basis of a temperature e' which is 1° C. lower than a preset temperature d', in the daytime when the sun shines and it is light outside. In the case where the illuminance is decreased by the rainfall or cloudy weather, the embodiment automatically performs the same operation as in the evening. When the temperature set in the air conditioner is changed at an illuminance of about 300 luxes, the actual effective temperature is scarcely affected by such a change. The above-mentioned temperature control is carried out by a control device shown in FIG. 9. Referring back to FIG. 9, a signal sent out from the photodetector 18a on the basis of a change in illuminance is applied to the controller 20. On receiving this signal, the controller 20 sends a signal for increasing or decreasing a preset temperature by $\Delta T°$ C., to a room temperature adjuster 19. Then, a signal is sent from the controller 20 to an output part (that is, a relay for a compressor), on the basis of a relation between the room temperature detected by the room-temperature detecting thermistor 16 and the set temperature having been varied by $\Delta T°$ C.

Figure 11:
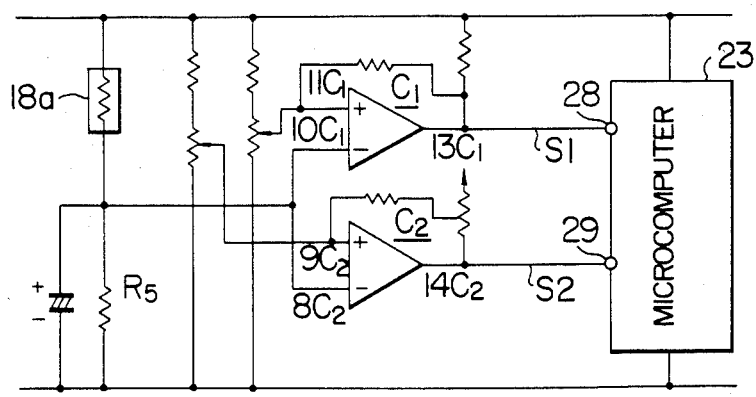
FIG. 11 is a circuit diagram showing a circuit for performing first and second temperature control operations according to the present invention.

FIG. 11 is a circuit diagram showing a circuit for carrying out the first and second temperature control. Referring to FIG. 11, when the photodetector 18a is irradiated with light, the resistance thereof is decreased. Input terminals $10C_1$ and $8C_2$ of comparators $C_1$ and $C_2$ are applied with a voltage which is obtained by dividing a supply voltage by the photodetector 18a and a resistor $R_5$. Another input terminal 11C of the comparator $C_1$ is applied with a reference voltage corresponding to an illuminance of about 30 luxes. When the illuminance at the photodetector 18a becomes less than about 10 luxes in the state that the embodiment is operated by the timer, a signal having the level of "1" is delivered from an output terminal $13C_1$ of the comparator $C_1$, and is applied, as a second temperature control signal $S_1$ (namely, a signal for greatly changing a preset temperature), to a terminal 28 of a microcomputer 23 for forming the controller 20. Another input terminal $9C_2$ of the comparator $C_2$ is applied with another reference voltage corresponding to an illuminance of about 300 luxes. When the illuminance at the photodetector 18a becomes less than about 300 luxes, a signal having the level of "1" is delivered from an output terminal $14C_2$ of the comparator $C_2$, and is applied, as a first temperature control signal $S_2$ (namely, a signal for slightly changing a preset temperature), to another terminal 27 of the microcomputer 23.

Figure 13:
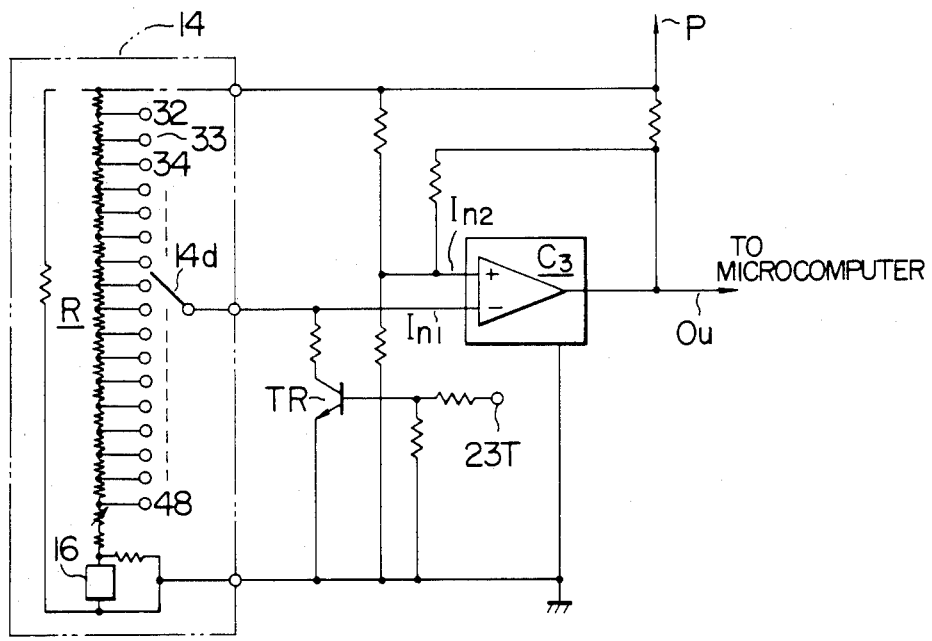
FIG. 13 is a circuit diagram showing a circuit for producing the temperature T shown in FIGS. 12A and 12B.
Figure 12A:
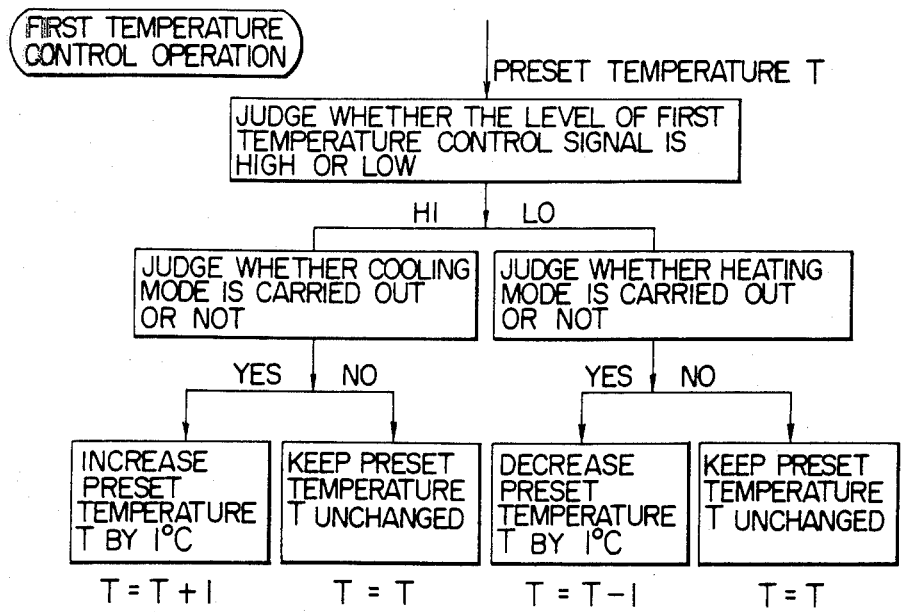
FIG. 12A is a flow-chart showing a first temperature control operation according to the present invention.
Figure 12B:
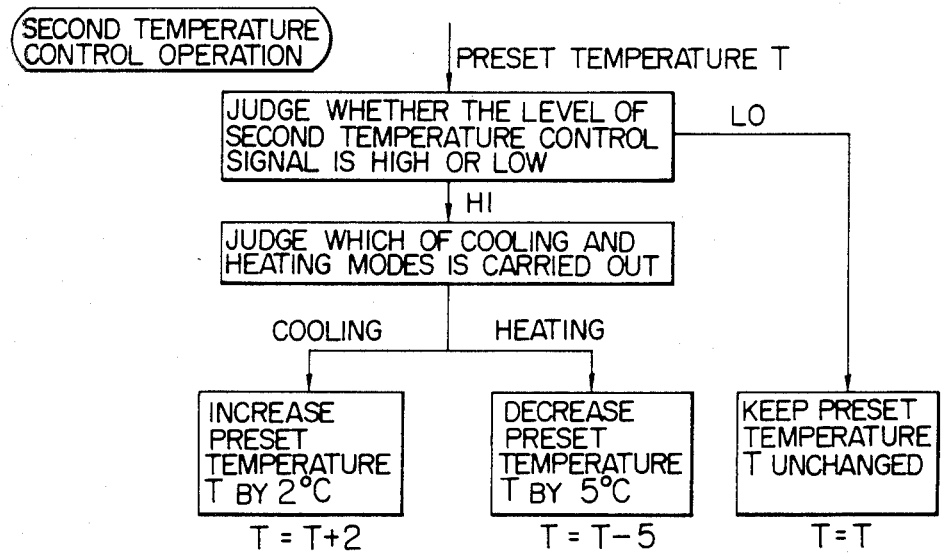
FIG. 12B is a flow-chart showing a second temperature control operation according to the present invention.

FIGS. 12A and 12B are flow charts showing the signal processing which is carried out for the first and second temperature control signals in the microprocessor 23. A preset temperature T shown in FIGS. 12A and 12B is given by a circuit shown in FIG. 13. Referring to FIG. 13, a resistor R is divided by terminals 32 to 48 into a multiplicity of parts, and one of the terminals 32 to 48 is selected by the room-temperature adjusting switch 14d of the operation part 14. One end of the resistor R is connected with the room-temperature detecting thermistor 16, and room temperature is detected on the basis of a change in the resistance of the thermistor 16.

Now, explanation will be made on the case where a temperature specified by the room-temperature adjusting switch 14d is varied by 1° C. on the basis of the first temperature control signal, with reference to FIG. 13. When the first temperature control signal $S_2$ is applied to the terminal 29 of the microcomputer 23, the processing shown in FIG. 12A is carried out by the microcomputer 23, and an output signal E acting as a control signal is sent out from the microcomputer 23 to a terminal 23T. When the terminal 23T is applied with the output signal E, a transistor TR is put in the ON-state, and the resistance between an input terminal $I_{n1}$ of a comparator $C_3$ and the ground is changed. Thus, for a cooling operation, a temperature set by the switch 14d is increased by 1° C. The above resistance change causes a change in a potential difference between the input terminal $I_{n1}$ and another input terminal $I_{n2}$ of the comparator $C_3$. An output from the output terminal OU of the comparator $C_3$ is applied to the microcomputer 23, to cause the microcomputer 23 to control the relay for the compressor. Incidentally, reference character P in FIG. 13 designates a power supply terminal.

Figure 14:
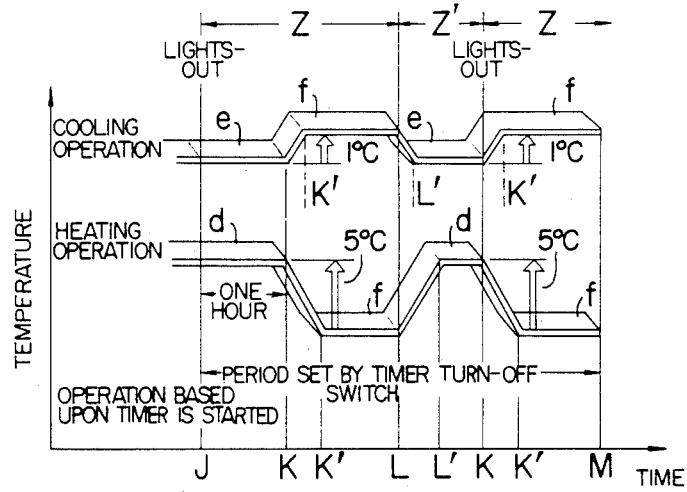
FIG. 14 is a graph showing operation patterns of the second temperature control circuit of the embodiment shown in FIG. 6.

FIG. 14 shows an example of the second temperature control operation (namely, the control operation for greatly changing a preset temperature). In a period Z when the lights are put out or dimmed in order for a person to fall asleep, a second temperature control operation is performed on the basis of the lights-out or dim-out, and the "SECOND TEMPERATURE CONTROL" indicating element 15f is turned on. In a period before a time J, the embodiment is operated on the basis of a temperature e which is 1° C. higher than a preset temperature, for a cooling operation, and is operated on the basis of another preset temperature d for a heating operation. At the time J, the person goes to bed and the lights are put out. In a period from the time J to the beginning of sleep, the metabolic rate of human energy is still large, and therefore the cooling and heating operations are performed at the temperature e and temperature d, respectively. At a time K' a little after a time K when the person is substantially put in a sleeping state, the same second temperature control operation as the conventional one is started. However, the second temperature control operation according to the present invention is different from the conventional second temperature control operation in that, when the person gets up in the course of bedtime and a lamp is turned on (a period Z' shown in FIG. 14), the illuminance due to the lamp is detected by the photodetector 18a, and the temperature set in the embodiment is automatically returned, at a time L, to the initial temperature e or d based upon a first temperature control operation. That is, cumbersome processing for changing the set position of switch is eliminated, and there is no fear of a person forgetting to set relevant switches. When the person again goes to bed and the lamp is put out, the embodiment is operated on the basis of the second temperature control operation till a time M, to which the timer turn-off switch 14g is set, and the embodiment is stopped at the time M. If the above-mentioned change in temperature is caused by an illuminance of about 10 luxes, such a change will suit actual circumstances. As mentioned above, a first temperature control operation for causing the embodiment to perform an operation which economizes in power without lowering comfort, and a second temperature control operation for causing the embodiment to perform an operation which can prevent excess cooling or heating in bedtime and economizes in power, are performed on the basis of the illuminance at a place subjected to air conditioning. The present embodiment is advantageous in the following points. The set position of each of the switches on the operation part 14 can be changed manually and readily, since the connection of the operation part 14 with the main part 11 by means of a cord is not made, but the operation part 14 is separated from the main part 11. Further, the oscillation switch 14i is linked with the lid 14' of the operation part 14 so that, when the lid 14' is put in the closed state, no signal is sent out from a portion hidden with the lid 14'. Accordingly, the current consumption of a battery used in the operation part 14 is small, and the useful life of the battery is made longer.

As has been explained in the foregoing, according to the present invention, a temperature set in an air conditioner is automatically changed on the basis of the illuminance detected by a photodetector without necessitating the turn-on or changeover of a switch. Thus, an operation can be performed which economizes in power. Further, a state that a lamp is turned on, is automatically distinguished from a state than the lamp is put out in bedtime, to carryout air conditioning suited for sleep.

We claim:

1. An air conditioner having a room temperature detector, a room temperature adjuster and a controller to cause said controller to control a compressor on the basis of an output from said room temperature detector so that a room temperature detected by said room temperature detector becomes equal to a predetermined temperature set in said room temperature adjuster, said air conditioner comprising a photodetector for generating a signal indicative of the illuminance at said photodetector to change said temperature set in said room temperature adjuster, by said controller, on the basis of said signal, first means for detecting a first illuminance having a predetermined value from the illuminance at said photodetector and second means for detecting a second illuminance having another predetermined value from the illuminance at said photodetector, and the output of said first means and the output of said second means are applied to said controller to change said temperature set in said room temperature adjuster, by said controller, in accordance with said outputs of said first and second means.

2. An air conditioner according to claim 1, wherein the resistance of said photodetector is decreased when said photodetector is irradiated with light.

* * * * *